Jan. 19, 1954  C. O. ROTHWEILER  2,666,675
ADJUSTABLE BEARINGS
Filed April 21, 1950  2 Sheets-Sheet 1

INVENTOR.
CHARLES O. ROTHWEILER
BY
Christian R. Nielsen
ATTORNEY.

Jan. 19, 1954

C. O. ROTHWEILER 2,666,675

ADJUSTABLE BEARINGS

Filed April 21, 1950

INVENTOR.
CHARLES O. ROTHWEILER
BY
Christian R. Nielsen
ATTORNEY.

Patented Jan. 19, 1954

2,666,675

UNITED STATES PATENT OFFICE 2,666,675

ADJUSTABLE BEARING

Charles O. Rothweiler, Milwaukee, Wis., assignor to David White Company, Milwaukee, Wis.

Application April 21, 1950, Serial No. 157,339

5 Claims. (Cl. 308—178)

My invention relates to adjustable bearings and more particularly to a type of bearing adaptable for the axis mounting of a telescope or the like.

The object of my invention is to provide a bearing that permits ease in mounting a telescope within a standard on a tripod or the like.

Another object of my invention is to provide a bearing that is adjustable laterally.

Still another object of my invention is to provide a bearing that is dust proof in its construction.

A still further object is to provide a bearing of the character described that is simple in construction, economical to produce, easy to assemble, yet efficient for the purpose for which it is intended.

In the assembly of transits or any other instrument incorporating a telescope, it is quite convenient to employ a device as specified and claimed herein, inasmuch as it provides a convenient means of inserting the telescope axis mounting between bearings which are constructed in a manner to permit adjustment for aligning the scope while assembling and retaining the scope in the proper position. The construction of the device is such that it will permit adjustment to correct any variations and displacements that may occur during transportation of the assembled device and the handling of it.

Other and further objects of my invention will become more apparent as the description proceeds and when taken in conjunction with the drawing in which Figure 1 is a fragmentary cross-sectional view of the bearing inserted into a telescope mounting and illustrating the manner in which the axis mounting of the scope is adjustably supported.

Figure 1:
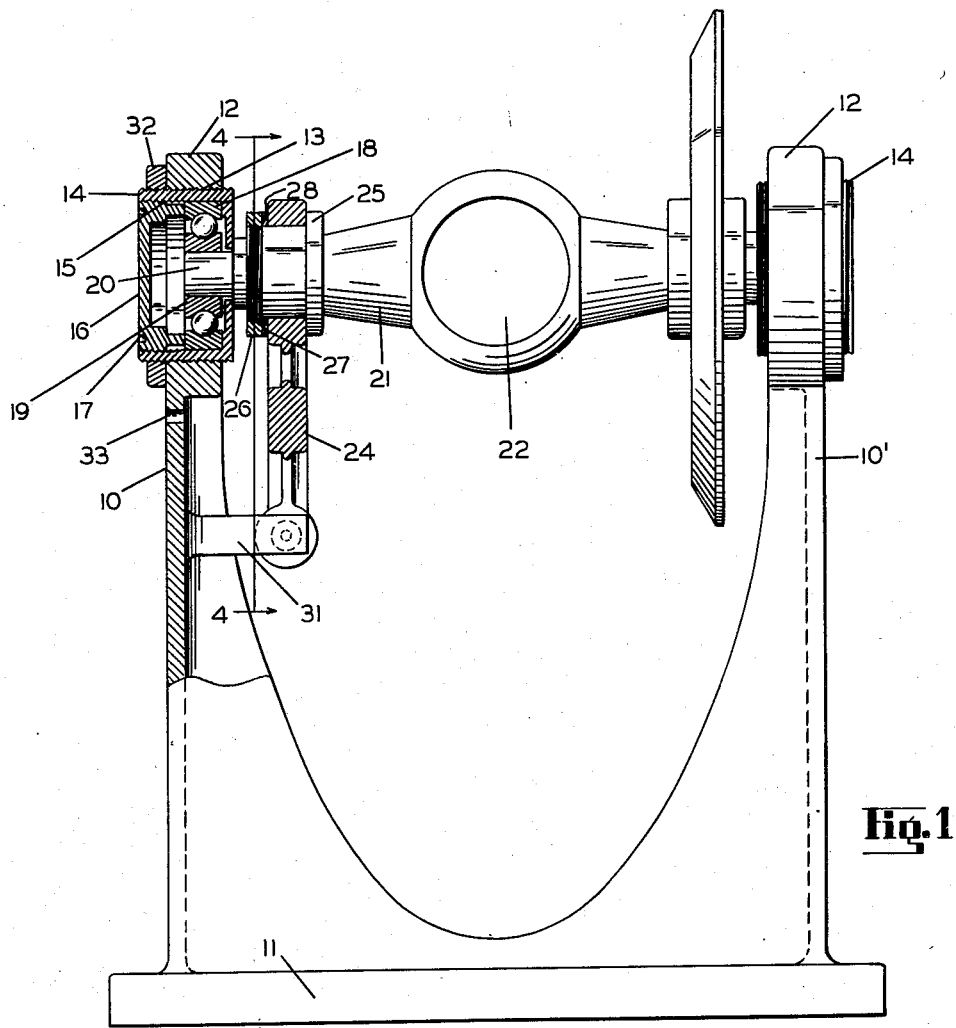
Figure 4:
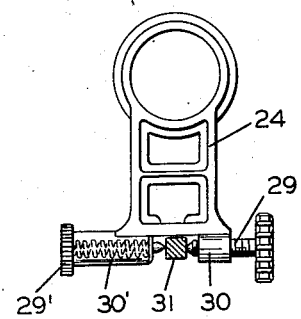
Figure 4 is a side view of the tangent clamp taken at the line 4—4 in Figure 1.
Figure 2:
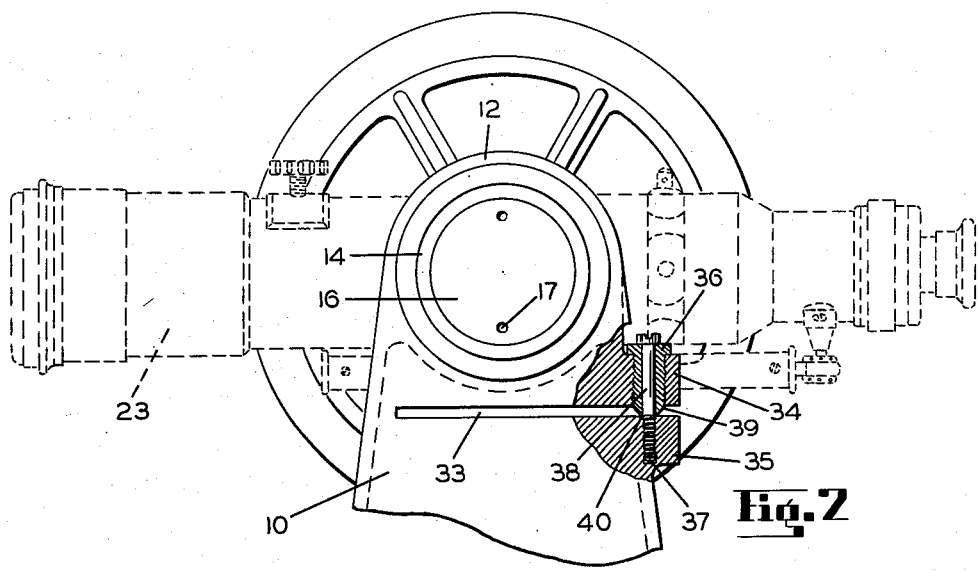
Figure 2 is a side view of the device showing the telescope in phantom and means for vertical adjustment of the axis mounting in cross-section.
Figure 3:
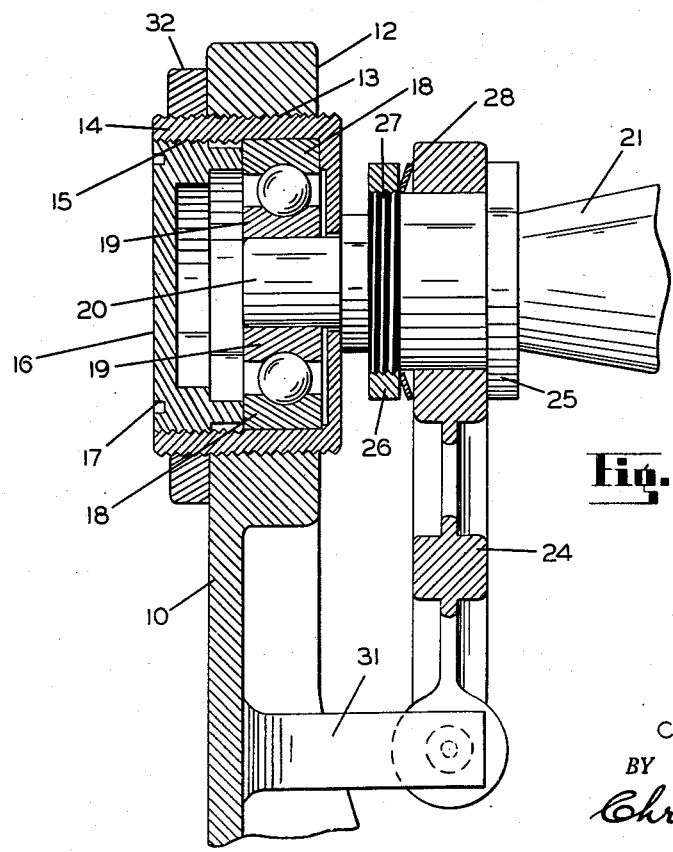
Figure 3 is an enlarged fragmentary cross-sectional view of the bearing supporting one end of the telescope axis mounting.

Similar characters of reference indicate corresponding parts throughout the several views and referring now to the same, the illustration shows a telescope standard comprising two upwardly disposed members 10 and 10' integrally mounted on a base plate shown as 11, which forms a standard mounting or attachment to a tripod or the like. The members 10 and 10' are provided with integral bearing support members shown as 12 which are threaded at 13 on their inside, to accommodate an adjustable bearing housing 14 which is threaded on the outside to engage the thread 13 within the aperture of the bearing support 12. The bearing housing 14 is also provided with an inside thread shown as 15 to receive and accommodate a plate shown as 16 which is placed in threaded engagement with the thread 15 by the use of a spanner wrench or the like, engaging the apertures 17 on the face of the plate 16, or the plate 16 may be fastened in any other convenient manner. The plate 16 when inserted engages the outer race 18 of the ball bearing assembly, thereby supporting the bearing in a fixed position within the bearing housing 14, and the inner race 19 of the ball bearing assembly acts as a support for the shaft member 20 forming a part of the telescope axis member 21 which is provided with an aperture 22 to receive a telescope shown in phantom as 23.

The axis mounting 21 is provided with a tangent clamp 24, which is supported against the shoulder 25 forming a part of the shaft 20 and held in frictional engagement therewith by means of the lock nut 26 supported by a thread 27 on the mounting 21, and provided with a cupped spring washer 28 to provide coefficient of friction. The tangent clamp 24 is shown actuated in the conventional manner by means of a threaded screw 29 which is mounted in a bearing 30. This screw 29 contacts a member 31 integrally formed with the mounting 10, and a bearing 30' supports a resiliently mounted pin 29' for contact with the reverse side of the member 31. The bearing housing 14 is locked in position and held by means of a lock nut 32 which engages the outer thread 13 of the housing 14. The member 10 is shown provided with a vertical axis adjustment in the form of a horizontally disposed slot 33, and the edges of the member 10 at the opening of the slot 33 are provided with an upper member 34 extending outward therefrom, and a lower member 35 also extending outward therefrom.

The upper member 34 has a tubular insert or bushing 36 threaded on its outer peripheral surface and threadedly engaging the member 34, while the lower member 35 is provided with a threaded aperture 37 into which a screw 38 extending through the bushing 36 is threadedly inserted. The lower end 39 of the bushing 36 contacts the lower face 40 of the slot 33, thereby providing a means of forcing the members 34 and 35 apart, while the screw 38 will permit drawing the members 34 and 35 toward one another when the bushing 36 is raised at the point of contact 40. Obviously, the combination of the screw 38 and the bushing 36 forms a locking means for keeping the slot in a fixed position.

From the foregoing description it is manifest that the bearing assembly as illustrated and described will permit ease of assembling the axis mounting 21 into the stand comprising the vertical members 10 and 10', which are integrally formed and supported at the lower end by the base 11, inasmuch as the threaded apertures in the support member 12 are larger than the shaft member 20, and will permit engagement of the adjustable bearing housing 14 from the outside. The housing 14 may be retained in a fixed position after assembly by the plate 16 which also seals the bearing from dust and foreign matter. Likewise, the tangent clamp 24 may be retained in frictional engagement with the axis mounting 21 by means of the lock nut 26 and the cupped spring washer 28. The vertical adjustment of the entire device is accomplished by means of the horizontal slot 33 within the member 10 which is spread apart or drawn together by means of the screw 38 and the bushing 36.

In the chosen embodiments of my invention there are many features not heretofore revealed or disclosed in the prior patent art and while I have shown a particular arrangement of the component parts constituting my invention, I am fully cognizant of the fact that many changes in the form and configuration of the various component parts may be made without effecting their operativeness, and I reserve the right to make such changes in the form and contour as I may deem necessary without departing from the spirit of my invention or the scope of the appended claims.

Having thus described my invention, what I claim and desire to secure by Letters Patent in the United States is:

1. An axially adjustable bearing assembly comprising, a frame having a threaded aperture therein, a generally tubular housing threadably mounted in said aperture and having centrally bored wall at one end thereof to receive the end of a shaft, a bearing assembly mounted within said housing against the inside of said wall, a cover plate threadably mounted in the open end of said housing and operative to fix said bearing assembly with respect to the housing, and a lock ring threadably mounted on the exterior of said housing and abutting said frame to fix the housing with respect to the frame.

2. The combination with an instrument frame having two generally vertical standards, each provided with bearing assemblies supporting the ends of telescope shaft, of means for adjusting one of said bearing assemblies vertically and comprising, a slot in one of said standards transverse a generally vertical plane including the axis of said shaft and extending through one of the standards a sufficient distance so that said one standard is integral on only one side of said plane, screw means on the other side of said plane for moving the portions of said one standard on opposite sides of said slot towards or away from each other.

3. An instrument telescope shaft bearing mounting, comprising, a frame including a base and a pair of vertical standards each of which includes a threaded aperture in general axial alinement with the threaded aperture in the other standard, a generally tubular housing threadedly mounted in each of said apertures and having a centrally bored wall at one end thereof, a bearing assembly mounted within each of said housings, a sealing plate threadedly mounted inside of each housing remote from the bored end wall of the housing and being operative to act on the bearing assembly to fix the bearing assembly with respect to the housing, a telescope shaft having each end supported in one of the bearings and provided with shoulders engaging with the outer face of said bored wall of each housing so the shaft may be adjusted axially when the housings are rotated.

4. The combination according to claim 3 including a lock ring threadedly mounted on the exterior of each housing and abutting the frame to hold each housing in its adjusted position.

5. Apparatus according to claim 3 and including means for adjusting one of the bearing housings vertically, comprising, a slot through one of the standards generally transverse a vertical plane including the axis of said shaft and extending through the standard a sufficient distance to leave but a portion of the standard on only one side of said plane integral, and means for moving the portions of the standard on opposite sides of said slot to and from each other and for retaining said standard portions in their adjusted relationship.

CHARLES O. ROTHWEILER.

References Cited in the file of this patent

UNITED STATES PATENTS

| Number | Name | Date |
|---|---|---|
| 1,451,523 | Benson | Apr. 10, 1923 |